March 10, 1959 D. D. DUESENBERG 2,876,759

VALVE SEAL

Filed Oct. 22, 1957

D. D. DUESENBERG
INVENTOR.

BY E. C. McRae
J. R. Faulkner
T. H. Oster

ATTORNEYS

United States Patent Office 2,876,759
Patented Mar. 10, 1959

2,876,759

VALVE SEAL

Denny D. Duesenberg, Dearborn, Mich., assignor to Ford Motor Company, Dearborn, Mich., a corporation of Delaware Application October 22, 1957, Serial No. 691,637
9 Claims. (Cl. 123—188)

My invention is concerned with the valve gear of internal combustion engines and more specifically with a means for controlling the leakage of fuel or lubricant between the valve and the valve guide. It is necessary that this type of leakage be controlled in order to avoid such deleterious effects as dilution of the lubricant between the valve and valve guide by fuel or sticking of the valve in the valve guide due to the carbonization of excess oil falling on the valve stem.

It is a further object to assure a definite air space between a cup seal and the valve guide to prevent fuel pumping action between the seal and the guide.

Another object of my invention is the provision of a spacer to prevent intimate contact between a cup seal and a valve guide.

A further object is the provision of protuberances forming a flared entrance through which a valve stem may be easily thrust during engine assembly.

These and other objects of this invention will become more apparent when the following preferred embodiment is considered in connection with the drawings in which:

Figures 1, 2 and 3 have been provided to aid in the understanding of this invention.

Figure 2:
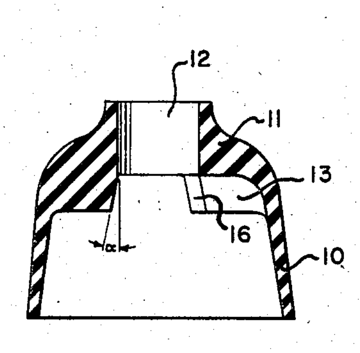
Figure 2 is a cross section of the seal taken on line 2—2 of Figure 1.
Figure 1:
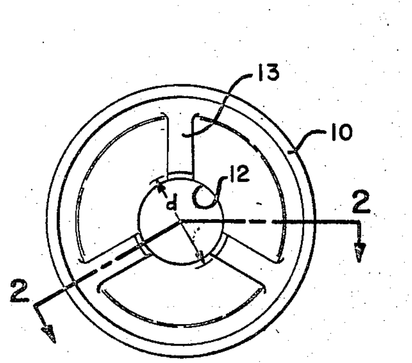
Figure 1 is a bottom plan view of the seal.

Referring to Figures 1 and 2 the cup seal will be seen to comprise a dependent flared skirt 10 integrally secured to a heavy annular base 11. Base 11 is provided with an opening 12 somewhat smaller in diameter than the valve stem which will be thrust therethrough. The portion of heavy annular base 11 which adjoins dependent flared skirt 10 is provided with protuberances 13. While protuberances 13 have been shown as radially disposed and three in number, this particular structure is by no means necessary and may be varied without departing from the invention.

The inner face 16 of protuberance 13 is outwardly flared to form an angle $\alpha$ with the axis of opening 12 so that a diameter ($d$) is formed which exceeds the diameter of opening 12 and preferably is at least as large as the valve stem over which the seal will be thrust. This provides simplified assembly and eliminates the distortion to the skirt 10 which would be caused by the compression of protuberance 13 on stem 14.

Skirt 10 is provided with a length sufficient so that none of the stem is exposed to direct oil wetting, taking into account the angle of the valve stem to vertical, if any.

Figure 3:
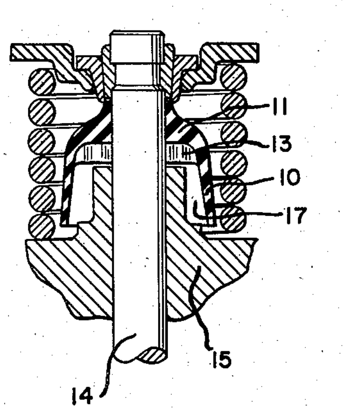
Figure 3 is a cross section of a portion of the valve gear incorporating the seal which comprises this invention.

Figure 3 is a cross section of a portion of the valve gear incorporating the instant invention and showing the valve stem in the fully depressed or open position. In this figure valve stem 14 has been thrust through opening 12 in heavy annular base 11 as the valve gear is assembled. Valve stem 14 is carried in valve guide 15. Protuberances 13 serve the purpose of preventing intimate contact between the lower face of heavy annular base 11 and the upper portion of valve guide 15. An air space 17 is formed between the cup seal and the guide 15 as defined by the valve stem and inner cup surface. The protuberances 13 prevent the seal 11 from forming a close fit between the seal and the valve guide 15. The air space therebetween acts as a pneumatic cushion and prevents an undesired suction action which would otherwise be caused by a close relationship between valve guide 15 and seal 11. This structure has served to reduce the oil consumption of engines in which it has been installed.

I claim as my invention:

1. An internal combustion engine comprising a poppet valve and an elastomer seal, said seal comprising a heavy annular base and a comparatively thin integral dependent flared skirt, the opening in the annular base being substantially smaller in its original dimensions than the valve stem whereby the seal is secured to the stem by friction only and moves in synchrony with the valve, said heavy annular base being provided with at least one protuberance on the face enclosed by the dependent flared skirt.

2. An internal combustion engine comprising a poppet valve and an elastomer seal, said seal comprising a heavy annular base and a comparatively thin integral dependent flared skirt, the opening in the annular base being substantially smaller in its original dimensions than the valve stem whereby the seal is secured to the stem by friction only and moves in synchrony with the valve, the frictional force between the valve stem and elastomer seal being greater than the axial force imparted to the elastomer seal by the acceleration of the valve, said heavy annular base being provided with at least one protuberance on the face enclosed by the dependent flared skirt.

3. In a valve stem oil deflector means for overhead valves, in combination with a vertically movable valve stem and a relatively stationary guide therefor having an upper bearing boss portion, an inverted cup-like member of elastomeric material on said valve stem above said guide and having a transverse portion and a depending skirt portion, said transverse portion having sufficient thickness for relative rigidity and said valve stem passing snugly but slidably through said transverse portion, said transverse portion being provided with at least one protuberance on the face enclosed by the dependent skirt, said protuberance abutting said guide bearing boss in one position of the valve stem, said skirt portion at that time surrounding the boss portion but spaced from the guide.

4. The combination of an internal combustion engine having an overhead poppet valve, a valve guide in which the stem of said valve reciprocates, and an oil seal comprising an annulus of elastomeric material through which said valve stem extends, the central opening of said annulus being of such diameter and thickness that it resiliently but firmly adheres to said valve stem and reciprocates in synchrony therewith, said seal including an integral continuation of said annulus extending therefrom radially sufficient to deflect descending oil from the valve stem adjacent to said valve guide, and further including protuberances on the annulus located so as to prevent contact of the annulus with the valve guide.

5. The device as in claim 1 wherein said protuberance has an inclined inner surface forming a flared entrance to said opening.

6. In a valve stem oil deflector of the class described embodying an inverted cup-like body of elastomer material having a central bore for snugly receiving a valve stem therethrough, that improvement therein wherein the body is formed with at least three internal ribs at the inner end of said bore, spaced angularly thereabout and arranged to contact the guide in which the valve stem reciprocates, said ribs being somewhat triangularly shaped in an axial plane, whereby to have a horizontal face and a somewhat axially extending face, the body having a skirt portion depending about the said ribs for telescopically covering the upper end of said valve guide when the ribs are in contact therewith.

7. The deflector of claim 6 wherein the inner axially extending ends of said ribs are tapered away from said bore for ease of assembly with the valve stem.

8. A valve stem seal for preventing direct oil wetting of the exposed valve stem portion of a poppet valve, siad valve stem seal comprising an annular elastomeric base and an integral dependent elastomeric skirt, said annular elastomeric base having at least one deformation on the face enclosed by the dependent skirt whereby the creation of an undesired suction between the valve stem seal and the associated valve guide is prevented.

9. An internal combustion engine comprising a poppet valve, a valve guide and an elastomer valve stem seal for preventing direct oil wetting of the exposed portion of the stem of the poppet valve, the valve stem seal comprising an annular elastomeric base and an integral elastomeric skirt, the face of the annular elastomeric base enclosed by the integral elastomeric skirt approaching the end face of the valve guide as the valve approaches the open position, said approaching surfaces being provided with at least one irregularity whereby the creation of an undesired suction between the valve stem seal and the associated valve guide is prevented.

References Cited in the file of this patent

UNITED STATES PATENTS

| | | |
|---|---|---|
| 1,711,267 | Hutt | Apr. 30, 1929 |
| 2,124,702 | Jacoby | July 26, 1938 |
| 2,698,012 | Smith et al. | Dec. 28, 1954 |